United States Patent
Sinha et al.

(10) Patent No.: US 9,586,464 B2
(45) Date of Patent: Mar. 7, 2017

(54) VEHICLE SUNROOF WIND DEFLECTOR

(71) Applicant: Nissan North America, Inc., Franklin, TN (US)

(72) Inventors: Sumon Sinha, Oxford, MS (US); Farokh Kavarana, Novi, MI (US); Dan Williams, Gilbert, AZ (US); Kazuya Asao, Kawasaki (JP)

(73) Assignees: NISSAN NORTH AMERICA, INC., Franklin, TN (US); NISSAN MOTOR CO., LTD., Kanagawa (JP); SINHATECH, Oxford, MS (US)

( * ) Notice: Subject to any disclaimer, the term of this patent is extended or adjusted under 35 U.S.C. 154(b) by 0 days.

(21) Appl. No.: 14/675,463

(22) Filed: Mar. 31, 2015

(65) Prior Publication Data

US 2016/0288632 A1    Oct. 6, 2016

(51) Int. Cl.
*B60J 7/22*    (2006.01)

(52) U.S. Cl.
CPC ........................... *B60J 7/22* (2013.01)

(58) Field of Classification Search
CPC ........................................................ B60J 7/22
USPC ................................................ 296/217
See application file for complete search history.

(56) References Cited

U.S. PATENT DOCUMENTS

| | | | | |
|---|---|---|---|---|
| 1,903,823 A * | 4/1933 | Lougheed | ............... | B64C 21/10 244/130 |
| 3,874,723 A * | 4/1975 | Coenen | ..................... | B60J 7/22 296/217 |
| 3,984,143 A * | 10/1976 | Vermeulen | ................. | B60J 7/22 296/217 |
| 4,142,759 A * | 3/1979 | Bienert | ...................... | B60J 7/22 296/217 |
| 4,396,224 A * | 8/1983 | Hayakawa | ................. | B60J 7/22 296/217 |
| 4,867,503 A * | 9/1989 | Luksch | ....................... | B60J 7/22 296/180.1 |
| 5,431,477 A * | 7/1995 | Smith | ........................ | B60J 7/22 296/152 |
| 6,213,543 B1 * | 4/2001 | Sumitani | .................... | B60J 7/22 296/217 |
| 7,404,600 B2 * | 7/2008 | Karami | ...................... | B60J 7/22 296/217 |
| 7,422,051 B2 | 9/2008 | Sinha | | |
| 7,866,741 B2 * | 1/2011 | Horiuchi | .................... | B60J 7/22 296/217 |
| 2009/0294596 A1 | 12/2009 | Sinha et al. | | |
| 2010/0194144 A1 | 8/2010 | Sinha | | |
| 2014/0076419 A1 | 3/2014 | Sinha | | |

FOREIGN PATENT DOCUMENTS

DE         4012569       *  5/1991
WO    2011149440 A2     12/2011

OTHER PUBLICATIONS

Chapter 6, Free Shear Flows, Javier Jimenez, pp. 81-82, website: http://torroja.dmt.upm.es/area_almnos/Introduccion_a_la_turbulencia/shear.pdf.*

* cited by examiner

*Primary Examiner* — Dennis H Pedder
(74) *Attorney, Agent, or Firm* — Global IP Counselors, LLP (57) ABSTRACT

A sunroof wind deflector for a vehicle includes a leading edge, a trailing edge and an outer surface extending between the leading edge and the trailing edge. The outer surface has a radius of curvature that changes along a length thereof so as to attenuate shear layer spreading.

18 Claims, 8 Drawing Sheets

β - is the angle of attack of the tangent at the Deflector Trailing Edge

Cp and Cf distributions are for Base airfoil at angle of attack β

VEHICLE SUNROOF WIND DEFLECTOR

BACKGROUND

Field of the Invention

The present invention generally relates to a vehicle sunroof wind deflector. More specifically, the present invention relates to a vehicle sunroof wind deflector that has an outer surface with a radius of curvature that changes along a length thereof so as to attenuate shear layer spreading.

Background Information

There are generally two types of conventional sunroof wind deflectors. One type is a bar type and the other type is a mesh type. The bar type is generally a plastic deflector that deflects the wind over the sunroof. The mesh type is generally a retractable mesh screen. Both types of deflectors attempt to reduce noise when the sunroof is in the open position.

SUMMARY

It has been discovered that to meet lower aerodynamic drag criteria, vehicle rooflines are becoming sloped forward so as to smoothly merge with the front windshield. Accordingly, some sunroofs can have an opening leading edge that is relatively far forward on the vehicle roof. Moreover, at the same time, some vehicles have a trailing edge of the opening of the vehicle sunroof located ahead of the maximum height position on the vehicle's roofline. Thus, the air flowing over the vehicle enters the passenger compartment due to a slightly forward tilted sunroof opening.

The present invention is directed to improving noise performance in these and other types of sunroof openings, at both low and high speeds. In view of the state of the known technology, one aspect of the present invention includes a wind deflector for a vehicle comprising a leading edge, a trailing edge and an outer surface extending between the leading edge and the trailing edge. The outer surface has a radius of curvature that changes along a length thereof so as to attenuate shear layer spreading.

Another aspect of the present invention includes a vehicle roof assembly, comprising a vehicle roof defining a roof opening, a moveable roof portion and a sunroof wind deflector. The moveable roof portion is disposed to be selectively positioned within the roof opening and in an open position so as to expose the roof opening. The sunroof wind deflector includes a leading edge, a trailing edge, and an outer surface extending between the leading edge and the trailing edge, the outer surface having a radius of curvature that changes along a length thereof so as to attenuate shear layer spreading.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
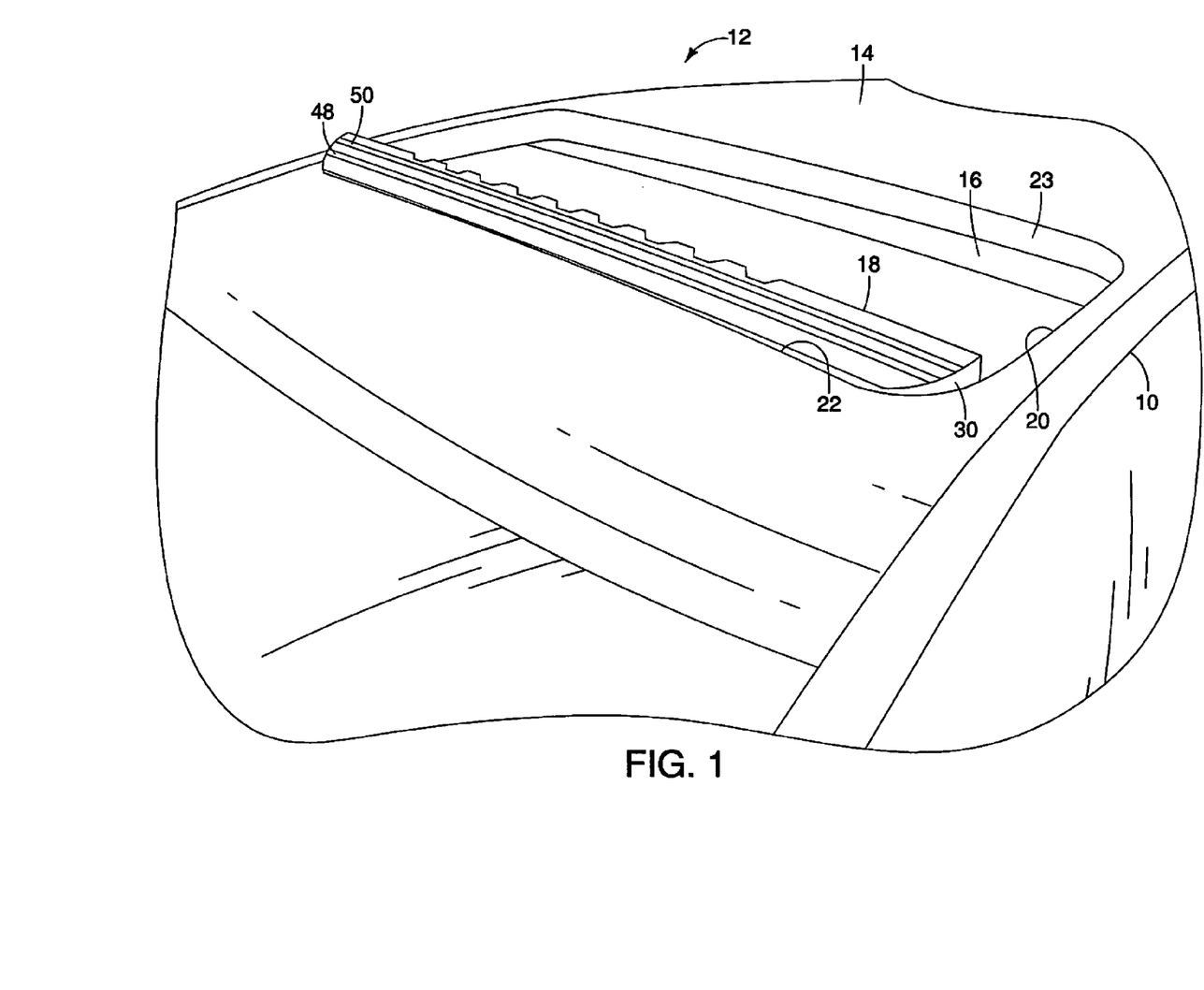
FIG. 1 is a top perspective view of a vehicle with a sunroof wind deflector according to one embodiment of the present invention.
Figure 2:
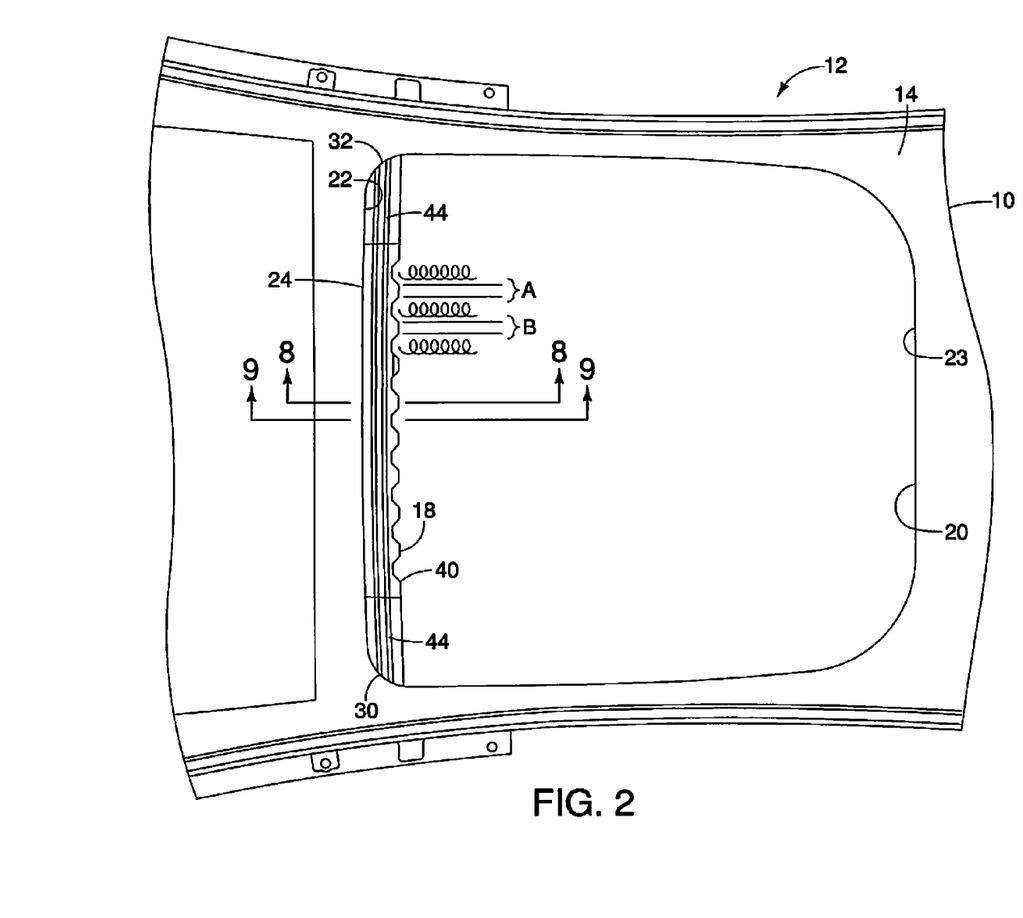
FIG. 2 is a top plan view of the sunroof wind deflector shown in FIG. 1.
Figure 3:
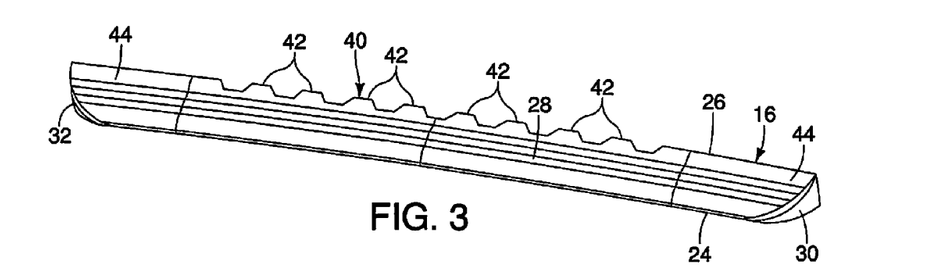
FIG. 3 is a front perspective view of the sunroof wind deflector shown in FIG. 2.
Figure 4:
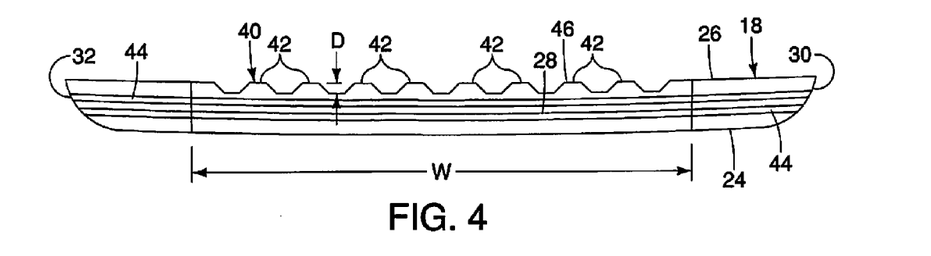
FIG. 4 is a top plan view of the sunroof wind deflector shown in FIG. 3.
Figure 5:
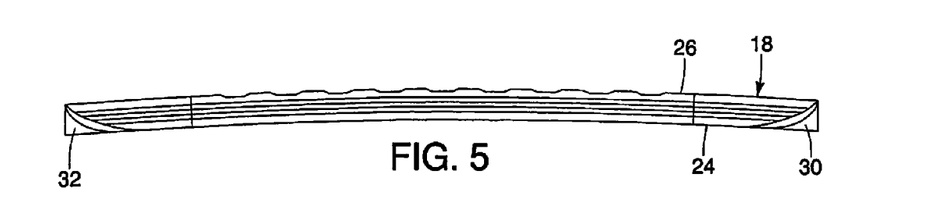
FIG. 5 is a front elevational view of the sunroof wind deflector shown in FIG. 4.
Figure 6:
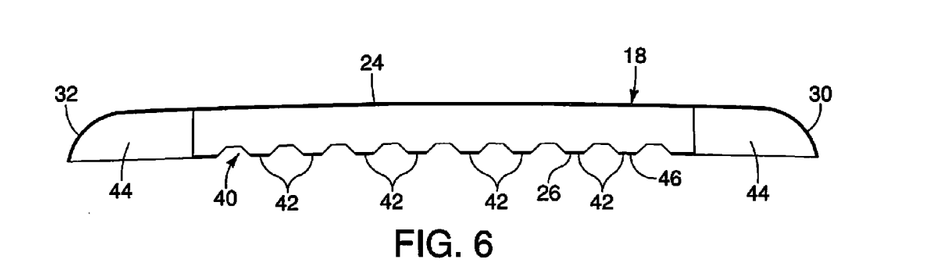
FIG. 6 is a bottom view of the sunroof wind deflector shown in FIG. 5.

Referring initially to FIGS. 1 and 2, a roof assembly 12 for a vehicle 10 in accordance with a first embodiment is shown. The vehicle roof assembly 12 includes a roof 14, a moveable roof portion 16 and a sunroof wind deflector 18. The vehicle roof 14 defines a roof opening 20, and the moveable roof portion 16 is disposed to be selectively positioned within the roof opening 20 and in a position so as to expose the roof opening 20.

The roof 14 can be any suitable roof of a vehicle 10 so as to define a roof opening 20. The roof opening 20 can be any opening in any portion of a vehicle roof 14. In one embodiment, the roof opening 20 can have an opening leading edge 22 that is relatively far forward on the vehicle roof 14. Moreover, the trailing edge 23 of the roof opening 20 can be located ahead of the maximum height position on the vehicle's roof 14. The sunroof wind deflector 18 is configured so as to be capable of retracting into the roof opening 20, to enable the moveable roof portion 16 to close and be positioned within the roof opening 20.

Figure 7:
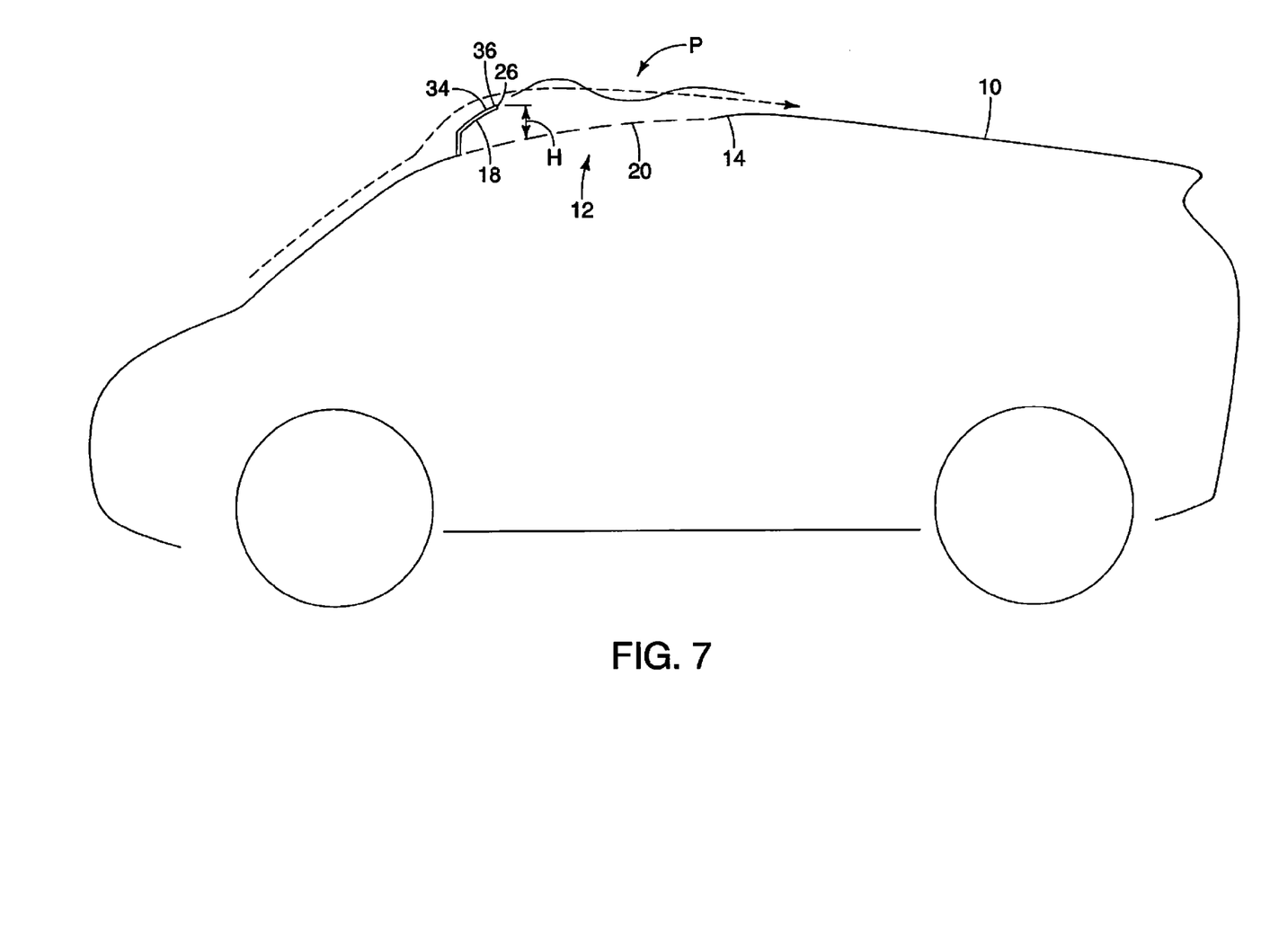
FIG. 7 illustrates a side view of the sunroof wind deflector shown in FIG. 1 attenuating shear layer spreading.
Figure 8:
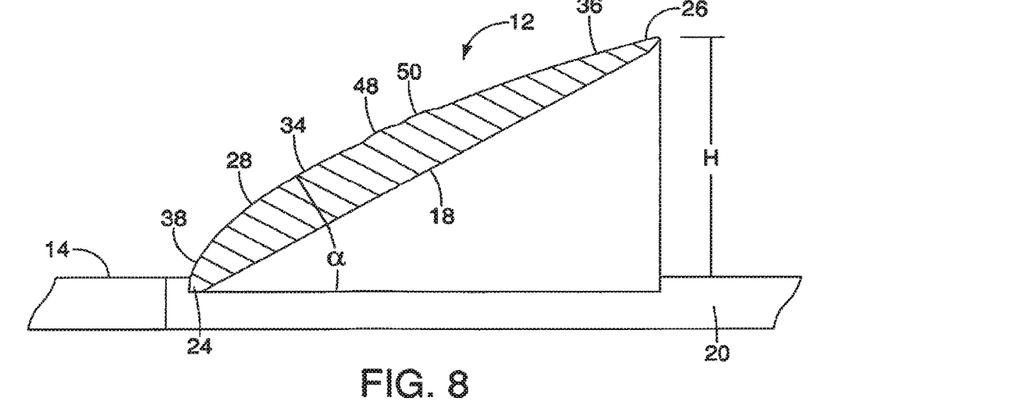
FIG. 8 is a cross sectional view of the sunroof wind deflector shown in FIG. 2 taken along lines 8-8.
Figure 9:
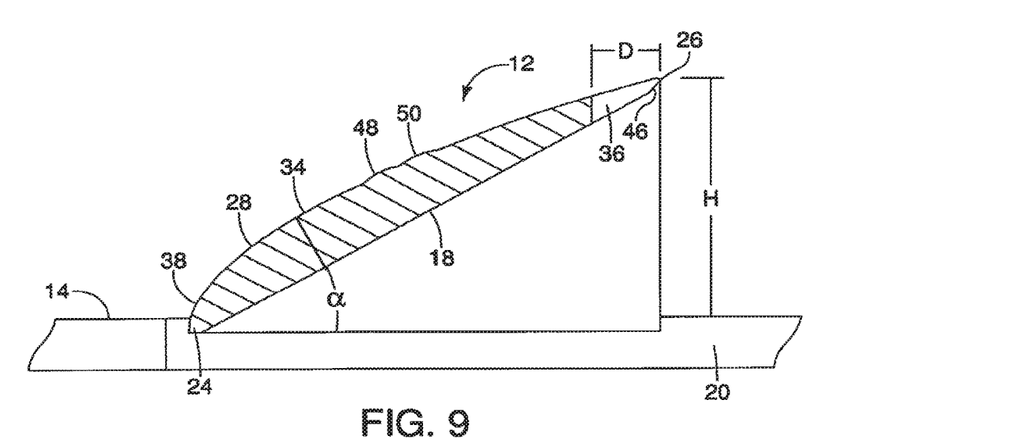
FIG. 9 is a cross sectional view of the sunroof wind deflector shown in FIG. 2 taken along lines 9-9.

As shown in FIGS. 3-6, the sunroof wind deflector 18 includes a leading edge 24, a trailing edge 26, and an outer surface 28 extending between the leading edge 24 and the trailing edge 26. The relationship between a predetermined height H and orientation of the sunroof wind deflector 18 is shown in FIGS. 7-9. The trailing edge 26 of the sunroof wind deflector 18 can be about the same height as the rear of the sunroof opening 20. The slope of the sunroof wind deflector 18 at the trailing edge 26 is generally parallel to the slope of the roof 14 immediately forward of the sunroof opening 20. However, since the sunroof wind deflector 18 has a curved outer surface 28, a portion of the outer surface 28 of the sunroof wind deflector 18 forms an angle α between 5 and 45 degrees relative to a roof 14 of the vehicle 10. This angle is generally equal to angle β shown in FIG. 10C.

As shown in FIGS. 3-6, the sunroof wind deflector 18 includes first and second end surfaces 30 and 32, at least a rear portion of each of the first and second end surfaces 30 and 32 extending substantially perpendicular to the outer surface 28. The first and second end surfaces 30 and 32 are curved at a front portion thereof.

In one embodiment, shown in FIG. 7, the sunroof wind deflector 18 includes an airfoil 34 disposed at the predetermined height H, and a rearward extension (i.e., a linear portion or straight portion) 36 having a height less than or equal to the predetermined height H. However, it is noted that the rearward extension 36 may have a height that is greater than the height of the reminder of the airfoil 34. In one embodiment, the sunroof wind deflector 18 has a predetermined height H between 27 mm and 34 mm. Thus, the trailing edge 26 of the sunroof wind deflector 18 is disposed between 27 mm and 34 mm above a roof 14 of the vehicle 10 such that wind passing over the sunroof wind deflector 18 contacts the roof 14 in an area to a rear of a sunroof opening 20.

As shown in FIG. 7-9, the outer surface 28 of the sunroof wind deflector 18 defines a predetermined airfoil profile. In one embodiment, the airfoil profile maximizes the air velocity separating from the trailing edge 26 while minimizing the height and inclination of the sunroof wind deflector 18. As shown in FIG. 8, the airfoil 34 includes a curved portion 38 at the leading edge 24 and the rearward extension 36 at the trailing edge 26. As shown in FIGS. 8 and 9, in one embodiment, the outer surface 28 of the sunroof wind deflector 18 has a radius of curvature that changes along a length thereof so as to attenuate shear layer spreading.

Figure 10A:
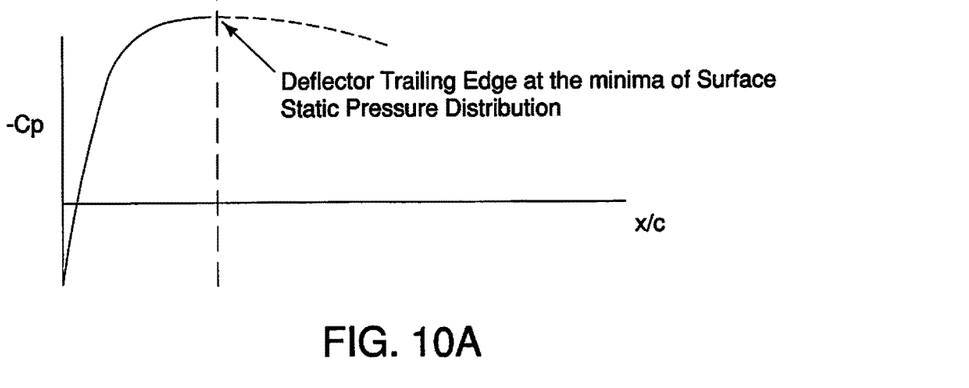
FIGS. 10A-10C are schematic representations of the sunroof wind deflector shown in FIG. 3.
Figure 10B:
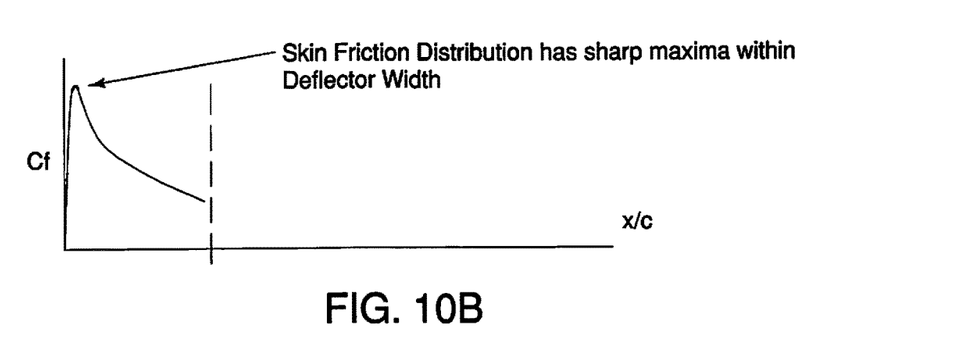
Figure 10C:
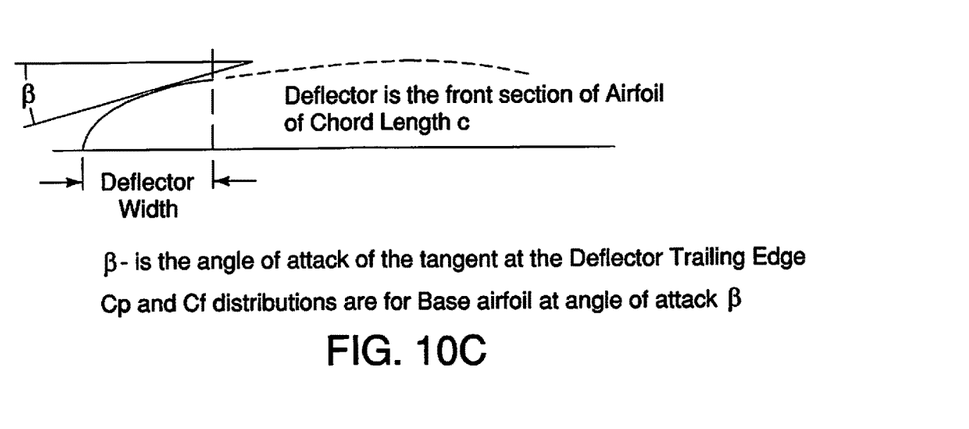

Accordingly, as shown in FIG. 7, the airfoil profile minimizes perturbation P from cross stream disturbances (e.g., cross stream disturbances caused by sunroof cavity resonance), by enabling a high velocity airflow across the sunroof opening 20. Thus, this embodiment allows for rapid acceleration of the airflow and yields a sunroof wind deflector 18 with a relatively short width. The deflector profile is the truncated front portion of an airfoil 34 of chord length c as shown in FIGS. 10A-10C. The position along the chord where the airfoil 34 is truncated is based on where the non-dimensional static pressure on the surface of the airfoil 34 minimizes, because the lowest static pressure corresponds to the highest velocity.

Moreover, as shown in FIGS. 10A-10C, as the flow accelerates, the local skin friction increases as depicted by the non-dimensional skin friction Cf. To estimate the distributions of Cp and Cf, a panel based inviscid two-dimensional Euler equation solver coupled with an integral boundary layer approximation can be applied to the complete airfoil 34 on which the sunroof wind deflector 18 is based. The airfoil 34 chord can be based on Reynolds numbers in the range of 1 million to 2.5 million and an angle of attack β corresponding to the tangent at the trailing edge 26 of the deflector and the chord line of the base airfoil 34 and being equal to the angle between the roof 14 and the outer surface 28 of the sunroof wind deflector 18. This embodiment has an airfoil 34 with predetermined characteristics (i.e., development of suction pressure minima close to the leading edge 24). The slope of the airfoil 34 profile can match the slope of the vehicle's roof line at the cutoff point (i.e., x/c at the sunroof wind deflector 18 width).

Table 1 shows examples of airfoil profiles based on c=1219 mm. These values correspond to x/c=0.05. Values of c can be varied within ±10% in order to scale the profile of Table 1 to a selected vehicle 10.

TABLE 1

Deflector Profile

| x-mm | y-mm |
|---|---|
| 62.911 | 52.986 |
| 41.940 | 42.587 |

TABLE 1-continued

Deflector Profile

| x-mm | y-mm |
|---|---|
| 31.455 | 36.405 |
| 20.970 | 29.163 |
| 17.825 | 26.676 |
| 14.679 | 23.994 |
| 11.534 | 21.043 |
| 8.388 | 17.691 |
| 5.243 | 13.728 |
| 3.146 | 10.444 |
| 1.887 | 7.961 |
| 1.049 | 5.840 |
| 0.315 | 3.121 |
| 0.000 | 0.000 |

As shown in FIGS. 2-6, the trailing edge 26 can include a notched portion 40 defining a plurality of notches 42. The notched portion 40 is disposed between a pair of un-notched portions 44 located adjacent side edges of the outer surface 28. In one embodiment, the notches 42 extend in a vehicle rearward direction (i.e., castled trailing edge 26). Each notch of the plurality of notches 42 defines a peak 46 and a thickness of the peak tapers in the vehicle rearward direction. The notched portion 40 is disposed between a pair of un-notched portions 44 located adjacent side edges of the outer surface 28.

The notches 42 serve to attenuate the low to intermediate frequencies resulting from coupling of the shear layer coming off the sunroof wind deflector 18 with sunroof cavity resonance modes. Only when cavity resonance bends the shear layer as shown in FIG. 2, the sloped edges of the notches shed vortices. These vortices cut the shear layer into ribbon-like sections comprising a plurality of shear layers, e.g., shear layer A and shear layer B. The modes of the individual shear layer flexural oscillations are decoupled and therefore not in phase. This de-energizes the strongest cavity resonance modes where the entire span of the sunroof opening 20 oscillates in phase.

The depth D of the notches 42 is approximately the same length as the rearward extension 36 of the sunroof wind deflector 18 profile adjacent the trailing edge 26 (FIGS. 8 and 9). Moreover, the width W (i.e., dissipation length) of the notches 42 is set at a distance that can create effective separation of the shear layer strips (e.g. shear layers A and B in FIG. 2). For example, the width of the notches 42 is at least 20% of the length of the sunroof opening 20. Further, the slope of the notches 42 is about 45–60°, and an odd number of notches 42 is preferred, to ensure attenuation of the cavity resonance modes. For example, the notches 42 can be numbered so as to divide the shear layer into about 10 strips so as to de-energize the cavity resonance modes by about a factor of 10.

Figure 11:
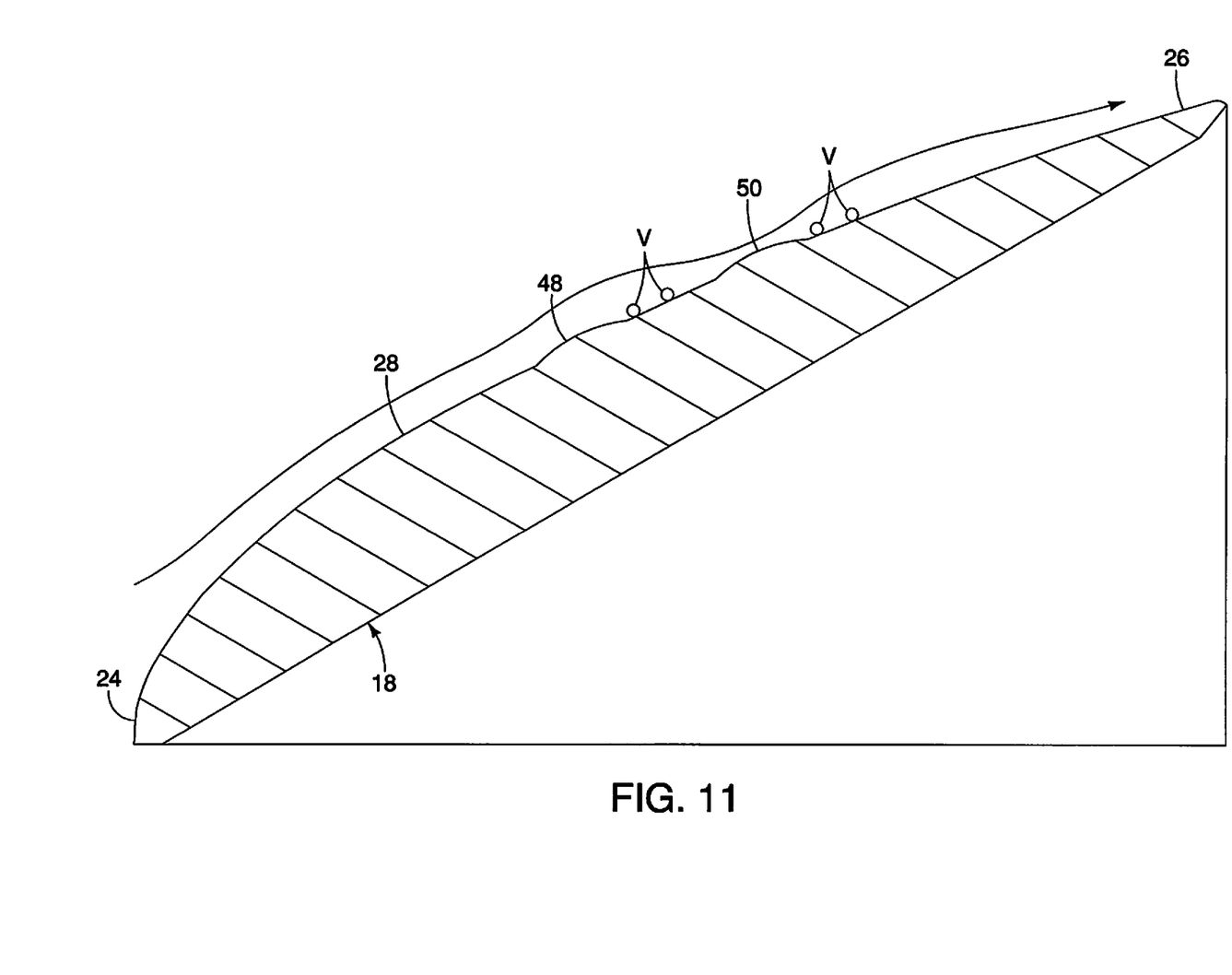
FIG. 11 is a cross sectional view illustrating an enlarged view of the outer surface of the sunroof wind deflector shown in FIG. 3.

FIG. 11 is an enlarged schematic view illustrating first and second protrusions 48 and 50 on the outer surface 28 of the sunroof wind deflector 18. Moreover, FIG. 11 illustrates that the first and second protrusions effect on the airflow over the sunroof wind deflector 18, causing laminar separation bubbles (vortices) V. To ensure proper airflow, the height of each of the protrusions 48 and 50 is preferably less than 10 μm above the outer surface 28. By restricting height to within the local momentum thickness of the boundary layer, undesirable turbulence can be suppressed. Under these conditions, and the presence of time depended changes in the flow, the flow traps the local wall shear into discrete vortices V. These vortices V roll like wheels over the surface. This rolling action speeds up the freestream on top of the vortices V. A faster flow coming off the trailing edge 26 is more immune to lateral disturbances. This attenuates coupling of the shear layer with cavity resonance modes.

As shown in FIG. 11, the first protrusion 48 is disposed closer to the leading edge 24 than the second protrusion 50. That is, the second protrusion 50 is disposed closer to the trailing edge 26 than the first protrusion 48. Further, as shown in FIG. 1, the first and second protrusions 48 and 50 extend widthwise along the outer surface 28 of the sunroof wind deflector 18 so as to extend between the first and second end surfaces 30 and 32. In one embodiment, the first and second protrusions 48 and 50 extend between the first and second end surfaces 30 and 32 so as to be parallel to each other.

As shown in FIG. 7, the sunroof wind deflector 18 discussed herein prevents the airflow flowing across the sunroof opening 20 from entering the sunroof opening 20 prior to the rear edge 23 of the sunroof opening 20; and maintains a thin shear layer in the wake of the trailing edge 26 of the deflector and over the sunroof opening 20. The profile geometry, setup angle and overall height of the sunroof wind deflector 18 enable the sunroof wind deflector 18 to satisfy both conditions simultaneously. Airflow flowing across the sunroof opening 20 that enters the sunroof opening 20 prior to the rear edge 23 of the sunroof opening 20 introduces large scale low frequency disturbances which usually cause cavity resonance and a low frequency "throb." If the sunroof wind deflector 18 shear layer is broad, a much taller sunroof wind deflector 18 is needed so as to prevent the airflow flowing across the sunroof opening 20 from entering the sunroof opening 20 prior to the rear edge 23 of the sunroof opening 20. Accordingly, sunroof wind deflector 18 discussed herein maintains a thin shear layer in the wake of the trailing edge 26 of the deflector and over the sunroof opening 20.

Figure 12:
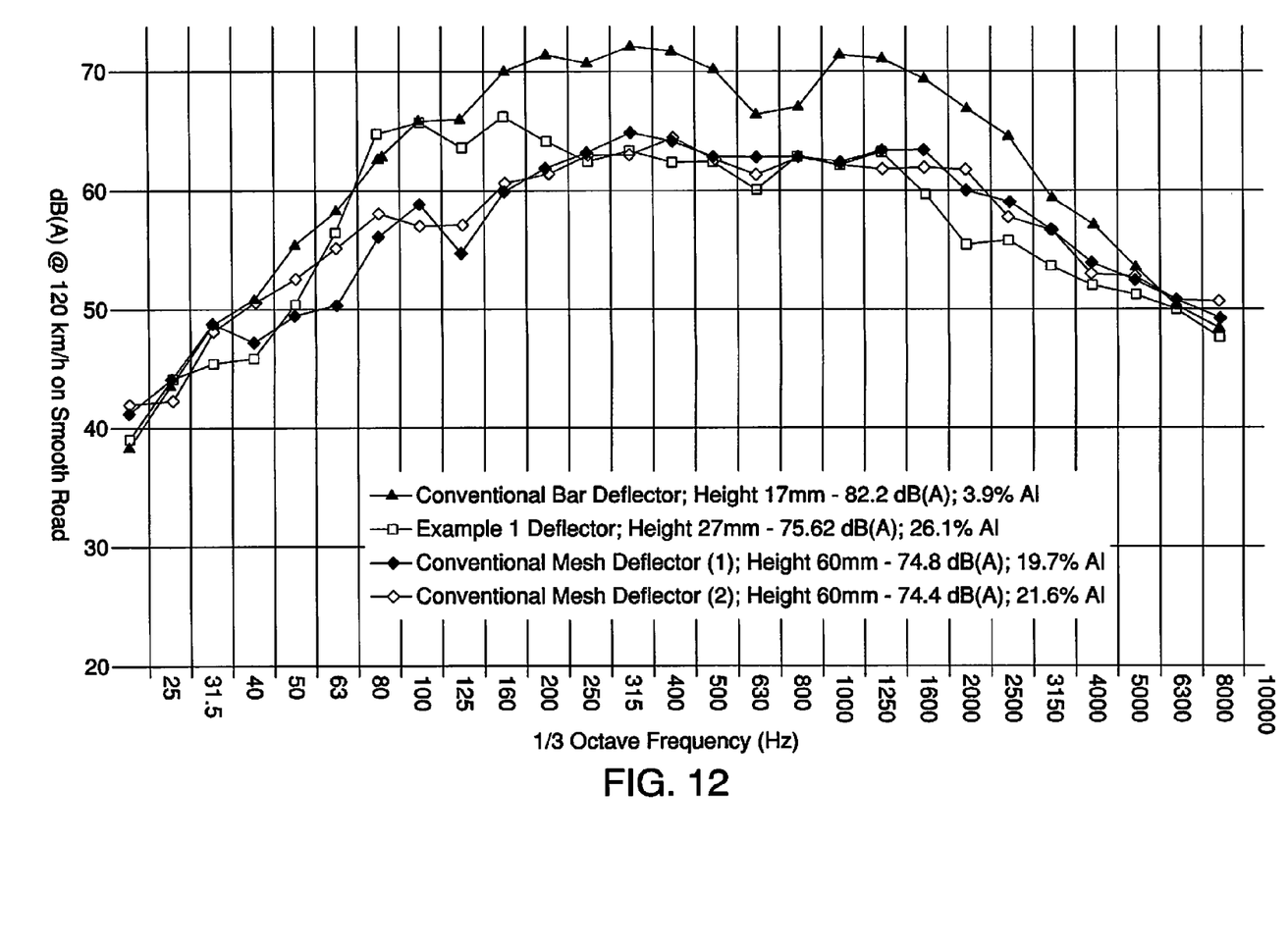
FIG. 12 is a graph comparing one embodiment of the present invention to conventional devices.

FIG. 12 compares conventional mesh deflectors and bar deflectors with an Example 1 of a sunroof wind deflector 18 according to one embodiment. FIG. 12 shows that a tall "Mesh" deflector (e.g., H=60 mm) has slightly worse high frequency performance compared to Example 1 (i.e., a 27 mm high sunroof wind deflector according to one embodiment of the present invention). Moreover, FIG. 12 illustrates that Example 1 has a lower dB(A) than the conventional bar deflectors over a large frequency range. Additionally, as shown in FIG. 12, Example 1 has the highest Articulation Index (AI) of 26.1% compared to an AI of 19.7% and 21.6% for the Mesh deflectors. A 17 mm conventional deflector has the lowest performance, i.e., a 3.9% AI. AI readings can range from zero to one, representing the proportion of the average speech signal that is audible. The closer the AI is to one, or 100 percent, the better a person should be able to hear speech. Accordingly, as would be understood, better noise performance in wind deflectors is indicated by having a higher AI (i.e., a higher percentage) and a lower dB(A). Thus, as illustrated in the graph of FIG. 12, it is apparent that the sunroof wind deflector described herein improves noise performance.

The roof 14 of the vehicle 10 and the moveable roof portion 16 are conventional components that are well known in the art. Since the roof 14 of the vehicle 10 and the moveable roof portion 16 are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiment(s), the following directional terms "forward", "rearward", and "above", as well as any other similar directional terms refer to those directions of a vehicle equipped with the vehicle sunroof wind deflector. Accordingly, these terms, as utilized to describe the present invention should be interpreted relative to a vehicle equipped with the vehicle sunroof wind deflector.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sunroof wind deflector for a vehicle, comprising:
a leading edge configured to be disposed adjacent a leading edge of an opening of a roof of the vehicle;
a trailing edge; and
an outer surface extending between the leading edge and the trailing edge, the outer surface having a radius of curvature that changes along a length thereof so as to attenuate shear layer spreading, and including at least one protrusion, the at least one protrusion being arcuate and configured to cause a laminar separation bubble so as to increase a freestream at a top of the at least one protrusion.

2. The sunroof wind deflector according to claim 1, wherein the trailing edge includes a notched portion defining notches.

3. The sunroof wind deflector according to claim 2, wherein
the notches extend in a vehicle rearward direction.

4. The sunroof wind deflector according to claim 3, wherein
each notch of the notches defines a peak and a thickness of the peak tapers in the vehicle rearward direction.

5. The sunroof wind deflector according to claim 2, wherein
the notched portion is disposed between a pair of un-notched portions located adjacent side edges of the outer surface.

6. The sunroof wind deflector according to claim 1, further comprising
first and second end surfaces, at least a rear portion of each of the first and second end surfaces extending substantially perpendicular to the outer surface.

7. The sunroof wind deflector according to claim 6, wherein
the first and second end surfaces are curved at a front portion thereof.

8. The sunroof wind deflector according to claim 6, wherein
the entire outer surface is a curved surface.

9. The sunroof wind deflector according to claim 1, wherein
the at least one protrusion protrudes less than 10 μm above the outer surface.

10. The sunroof wind deflector according to claim 1, wherein
the at least one protrusion is a plurality of protrusions, and a first protrusion of the plurality of protrusions is disposed closer to the leading edge than a second protrusion of the plurality of protrusions.

11. The sunroof wind deflector according to claim 10, wherein
the outer surface includes first and second side edges and the first and second protrusions extend between the first and second side edges.

12. The sunroof wind deflector according to claim 11, wherein
the first and second protrusions extend between the first and second side edges so as to be parallel.

13. The sunroof wind deflector according to claim 1, wherein
the sunroof wind deflector is configured to have at least a portion with a predetermined height between 27 mm and 34 mm from the outer surface to the roof of the vehicle.

14. The sunroof wind deflector according to claim 1, wherein
the sunroof wind deflector is configured to form an angle between 5 and 45 degrees between the outer surface and the roof of the vehicle.

15. A vehicle roof assembly, comprising:
a vehicle roof defining a roof opening;
a moveable roof portion disposed to be selectively position within the roof opening and in a position so as to expose the roof opening; and
a sunroof wind deflector including a leading edge, a trailing edge, and an outer surface extending between the leading edge and the trailing edge, the outer surface having a radius of curvature that changes along a length thereof so as to attenuate shear layer spreading and including at least one protrusion, the at least one protrusion being arcuate and configured to cause a laminar separation bubble so as to increase a freestream at a top of the at least one protrusion, and at least a portion of the leading edge being disposed above the vehicle roof while in a non-retracted position.

16. The vehicle roof assembly according to claim 15, wherein
the sunroof wind deflector is configured to be retractable into the roof opening.

17. The vehicle roof assembly according to claim 15, wherein
the trailing edge is disposed between 27 mm and 34 mm above the vehicle roof such that wind passing over the sunroof wind deflector contacts the roof in an area to a rear of the roof opening.

18. The vehicle roof assembly according to claim 15, wherein
the outer surface forms an angle between 5 and 45 degrees relative to the vehicle roof.

* * * * *